(12) United States Patent
Masuda et al.

(10) Patent No.: US 11,592,383 B2
(45) Date of Patent: Feb. 28, 2023

(54) FLOW PATH DEVICE AND MEASUREMENT APPARATUS

(71) Applicant: KYOCERA Corporation, Kyoto (JP)

(72) Inventors: Yuji Masuda, Yasu (JP); Masashi Yoneta, Kagoshima (JP); Jumpei Nakazono, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/578,033

(22) Filed: Jan. 18, 2022

(65) Prior Publication Data

US 2022/0260477 A1 Aug. 18, 2022

Related U.S. Application Data

(63) Continuation of application No. 16/964,224, filed as application No. PCT/JP2018/028446 on Jul. 30, 2018, now Pat. No. 11,255,770.

(30) Foreign Application Priority Data

Jan. 30, 2018 (JP) .............................. JP2018-013833

(51) Int. Cl.
*G01N 15/10* (2006.01)
*G01N 15/00* (2006.01)

(52) U.S. Cl.
CPC . *G01N 15/1056* (2013.01); *G01N 2015/0046* (2013.01)

(58) Field of Classification Search
CPC ............... G01N 15/06; G01N 15/1404; G01N 2015/1006; G01N 2015/1486;

(Continued)

(56) References Cited

U.S. PATENT DOCUMENTS 7,625,760 B2   12/2009  Kitaguchi et al.
11,255,770 B2 *  2/2022  Masuda ............. G01N 15/1056

(Continued)

FOREIGN PATENT DOCUMENTS

CN      101371373 A    2/2009
CN      104042253 A    9/2014

(Continued)

OTHER PUBLICATIONS

Cupelli, C., et al., "Leukocyte enrichment based on a modified pinched flow fractionation approach," Microfluidics and Nanofluidics, Mar. 2013, vol. 14, issues 3, 4, pp. 551-563.

*Primary Examiner* — Hoa Q Pham
(74) *Attorney, Agent, or Firm* — Volpe Koenig

(57) ABSTRACT

A flow path device comprises a plate-like measurement flow path device and a plate-like separation flow path device. The measurement flow path device includes a first flow path for measuring specific particles on a first fluid and connected to a third flow path and a second flow path for correction and passing a second fluid, not including the specific particles. The separation flow path device includes a fourth flow path for separating and selecting the specific particles from a sample and collecting a fluid. The separation flow path device is on the measurement flow path device's upper surface. The sample passes through a fifth flow path, the upper surface's opening, and flows into the fourth flow path from an opening in the separation flow path device's lower surface. The first fluid passes through the lower surface's opening, and flows into the first flow path from the upper surface's opening.

11 Claims, 16 Drawing Sheets

(58) Field of Classification Search
CPC ... G01N 2015/1493; G01N 2015/1497; G01N 21/47; G01N 21/6486; G01N 21/53; G01N 33/4915; G01N 15/056; G01N 2015/0046
USPC ......... 356/335–343, 73, 246; 422/82.05, 502
See application file for complete search history.

(56) References Cited

U.S. PATENT DOCUMENTS

| | | | |
|---|---|---|---|
| 11,351,542 B2 * | 6/2022 | Yoneta | G01N 15/1404 |
| 2004/0086869 A1 | 5/2004 | Schembri | |
| 2009/0202251 A1 | 8/2009 | Shibayama | |
| 2010/0020321 A1 | 1/2010 | Furuki et al. | |
| 2014/0275866 A1 | 9/2014 | Gunnerson et al. | |
| 2015/0049333 A1 | 2/2015 | Gourley | |
| 2016/0097739 A1 | 4/2016 | Pennathur et al. | |
| 2019/0323939 A1 | 10/2019 | Masuda et al. | |
| 2019/0339189 A1 * | 11/2019 | Takeda | G01N 35/1009 |
| 2021/0322985 A1 * | 10/2021 | Yoneta | B01L 3/502761 |
| 2021/0356378 A1 * | 11/2021 | Yoneta | G01N 15/1404 |
| 2022/0018751 A1 * | 1/2022 | Masuda | G01N 35/00069 |

FOREIGN PATENT DOCUMENTS

| | | |
|---|---|---|
| EP | 1203959 A1 | 5/2002 |
| EP | 2778679 A1 | 9/2014 |
| JP | 2003-004752 A | 1/2003 |
| JP | 2004-151109 A | 5/2004 |
| JP | 2008-244165 A | 10/2008 |
| JP | 2009-162650 A | 7/2009 |
| JP | 2010-535511 A | 11/2010 |
| JP | 2011-013208 A | 1/2011 |
| JP | 4627395 B2 | 2/2011 |
| JP | 2014-006085 A | 1/2014 |
| JP | 2014-182134 A | 9/2014 |
| WO | 2009/021215 A1 | 2/2009 |
| WO | 2010/140706 A1 | 12/2010 |
| WO | 2017/221986 A1 | 12/2017 |

* cited by examiner

F I G. 6
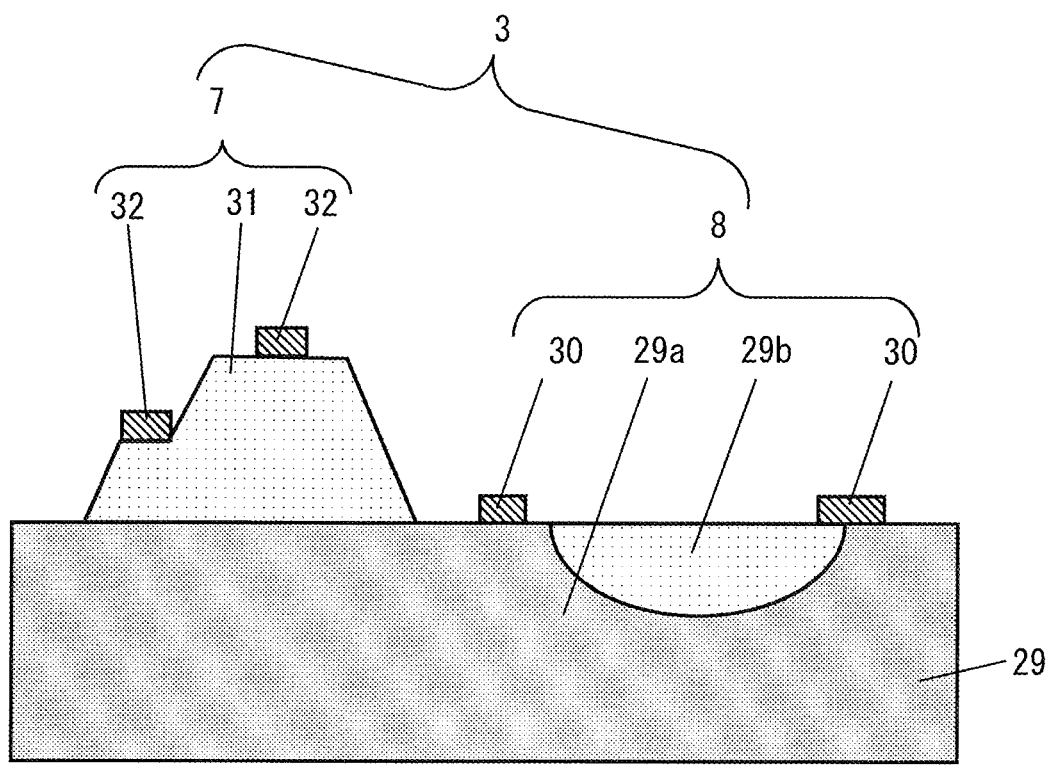

F I G. 9
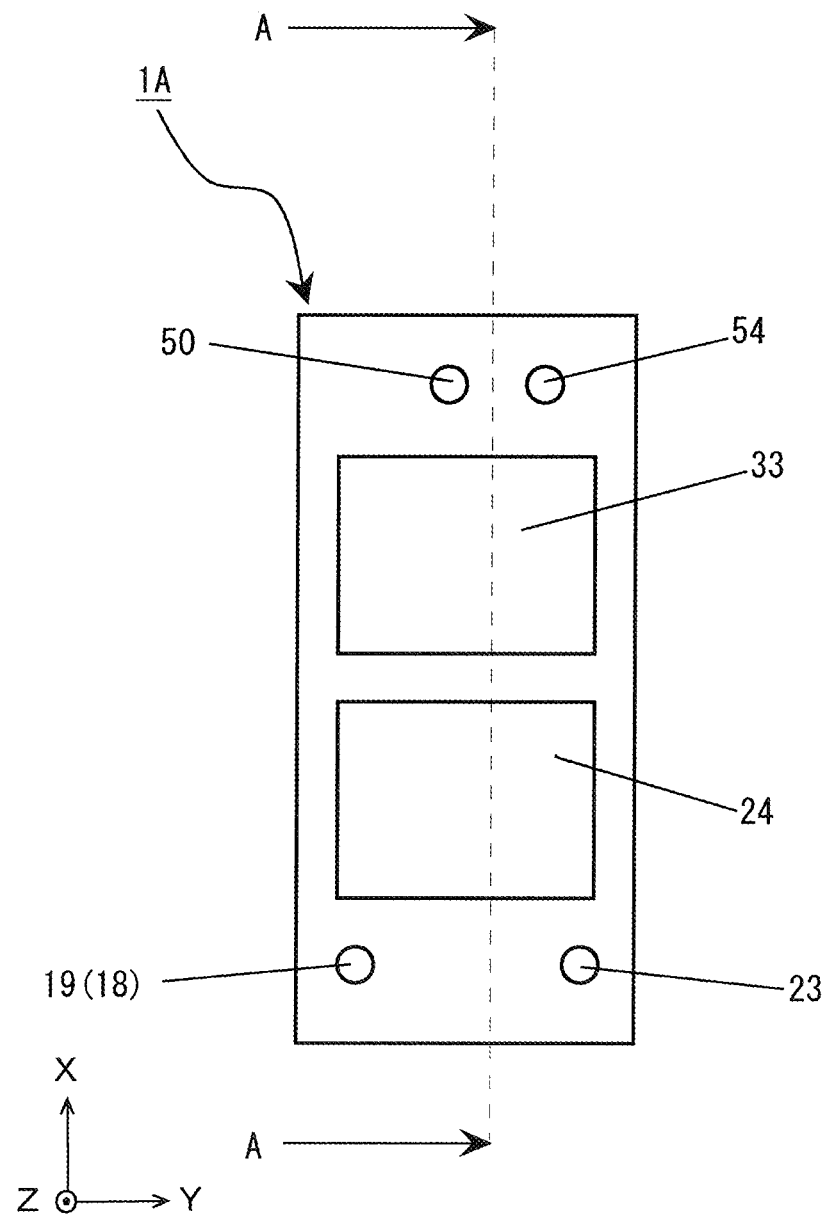

F I G. 1 5
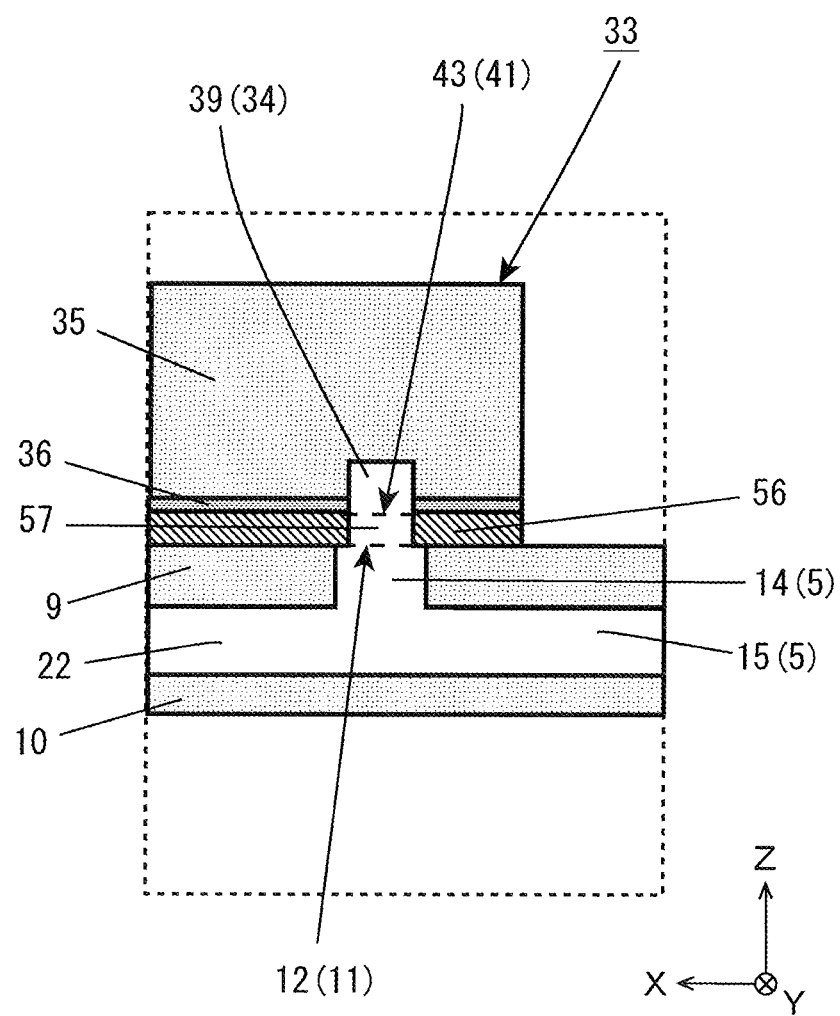

FLOW PATH DEVICE AND MEASUREMENT APPARATUS

CROSS-REFERENCE TO RELATED APPLICATION

This application is a continuation application of U.S. patent application Ser. No. 16/964,224 filed on Jul. 23, 2020, which is a National Phase entry based on PCT Application No. PCT/JP2018/028446, filed on Jul. 30, 2018, entitled "MEASUREMENT APPARATUS", which claims the benefit of Japanese Patent Application No. 2018-013833, filed on Jan. 30, 2018, entitled "MEASUREMENT APPARATUS". The contents of which are incorporated by reference herein in their entirety.

FIELD

The present disclosure relates to a flow path device and a measurement apparatus.

BACKGROUND

A measurement of microparticles is conventionally known.

SUMMARY

A flow path device and a measurement apparatus is disclosed. In one embodiment, a flow path device includes a plate-like measurement flow path device and a plate-like separation flow path device. The plate-like measurement flow path device includes a first flow path for performing a measurement regarding specific particles on a first fluid including the specific particles, a second flow path for correction through which a second fluid which does not include the specific particles passes, and a third flow path connected to the first flow path. The plate-like separation flow path device includes a fourth flow path for separating and selecting the specific particles from a sample including the specific particles and collecting a fluid including the specific particles as the first fluid. The plate-like separation flow path device is located on an upper surface of the plate-like measurement flow path device. The sample passes through a fifth flow path included in the plate-like measurement flow path device, passes through an opening in the upper surface of the plate-like measurement flow path device, and then flows into the fourth flow path from an opening in a lower surface of the plate-like separation flow path device. The first fluid passes through an opening in the lower surface of the plate-like separation flow path device, and then flows into the first flow path from an opening in the upper surface of the plate-like measurement flow path device.

In one embodiment, a measurement apparatus includes the flow path device according the one embodiment described above and an optical sensor located to face the measurement flow path device.

BRIEF DESCRIPTION OF THE DRAWINGS

FIG. 6 illustrates a cross-sectional view showing an optical sensor according to the first embodiment of the present disclosure.

FIG. 9 illustrates a top view showing a measurement apparatus according to a second embodiment of the present disclosure.

FIG. 15 illustrates a cross-sectional view showing a part of the measurement apparatus according to the second embodiment of the present disclosure.

DETAILED DESCRIPTION

An example of a measurement apparatus according to the present disclosure is described hereinafter with reference to the drawings. In the present disclosure, a rectangular coordinate system (X,Y,Z) is defined for descriptive purposes to define a positive side in a Z axis direction as an upper side, however, in the present disclosure, any direction may be the upper side or a lower side. The following contents illustrate embodiments of the present disclosure, and the present disclosure is not limited to these embodiments.

First Embodiment (Measurement Apparatus)

Figure 1:
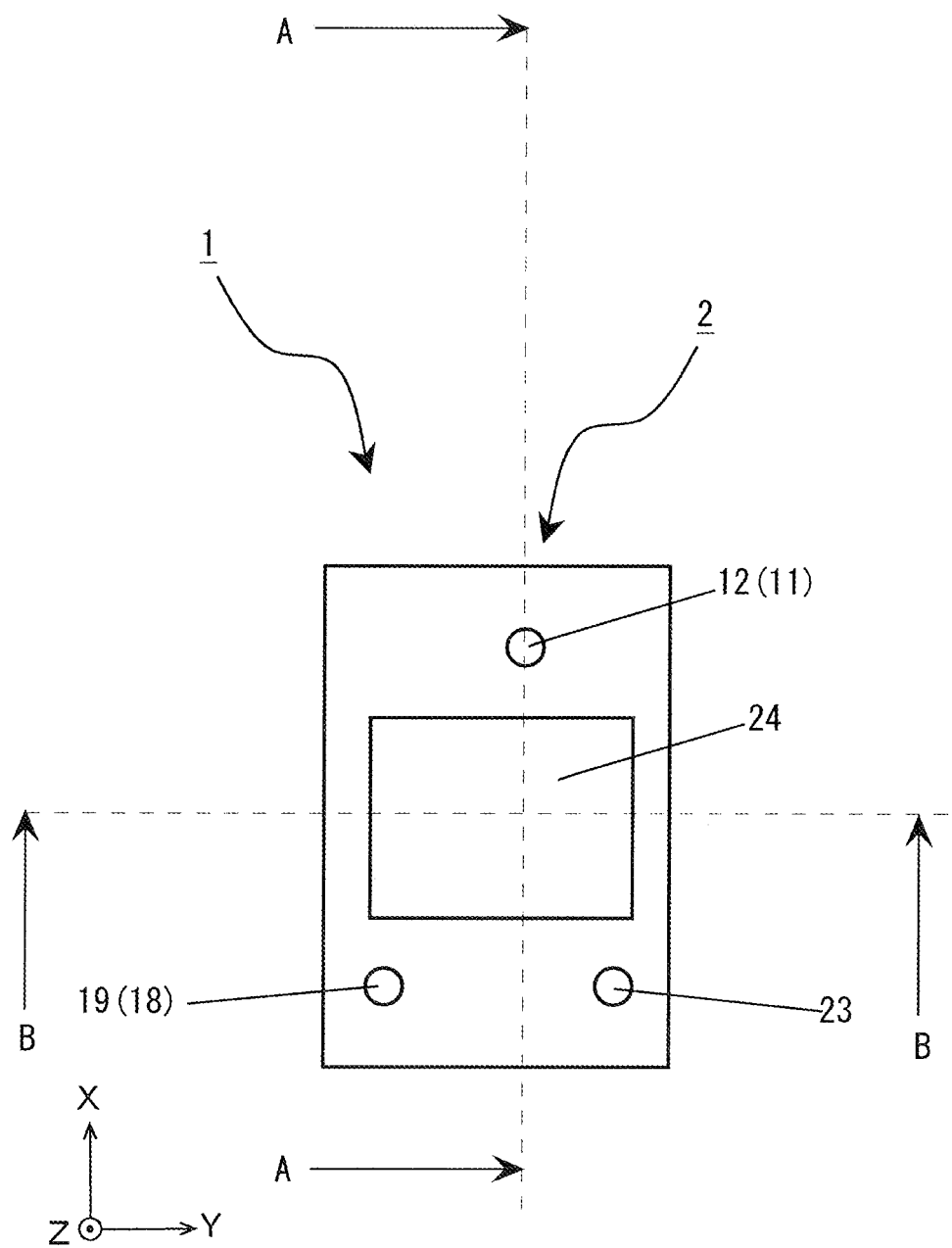
FIG. 1 illustrates a top view showing a measurement apparatus according to a first embodiment of the present disclosure.
Figure 2:
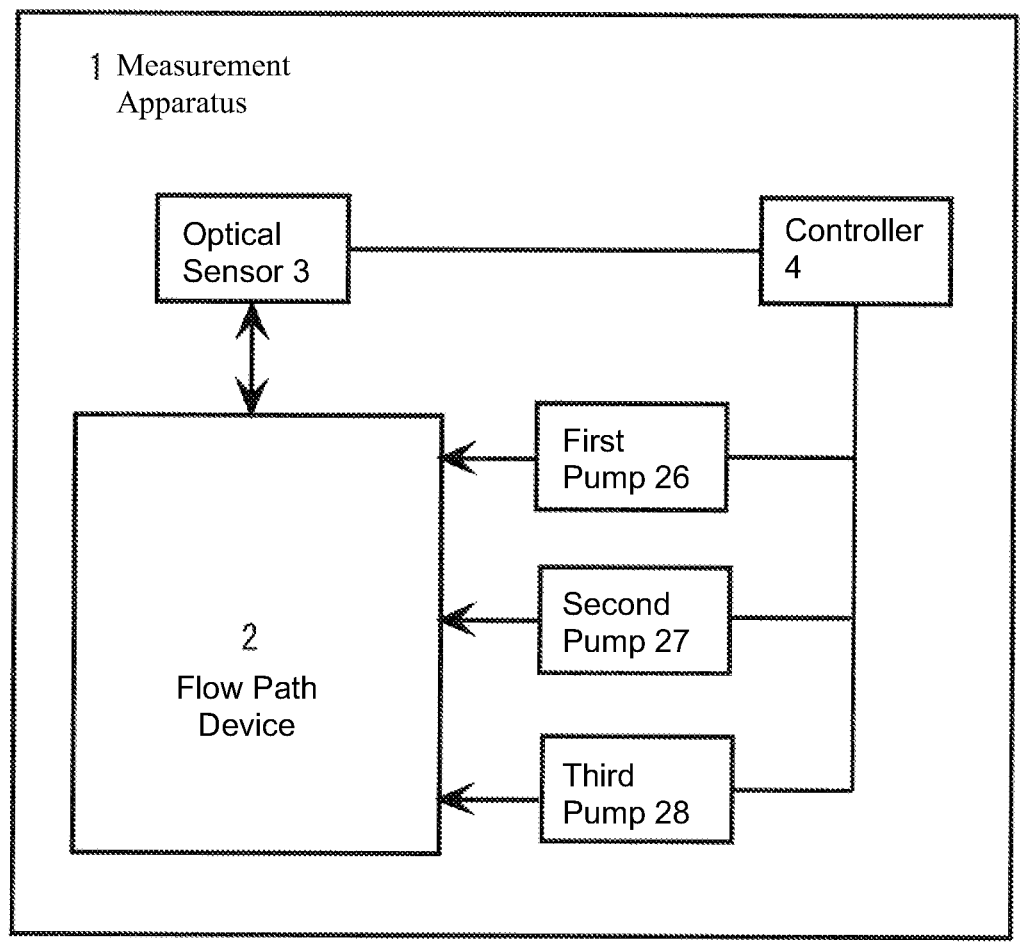
FIG. 2 illustrates a block diagram schematically showing a configuration of the measurement apparatus according to the first embodiment of the present disclosure.
Figure 3:
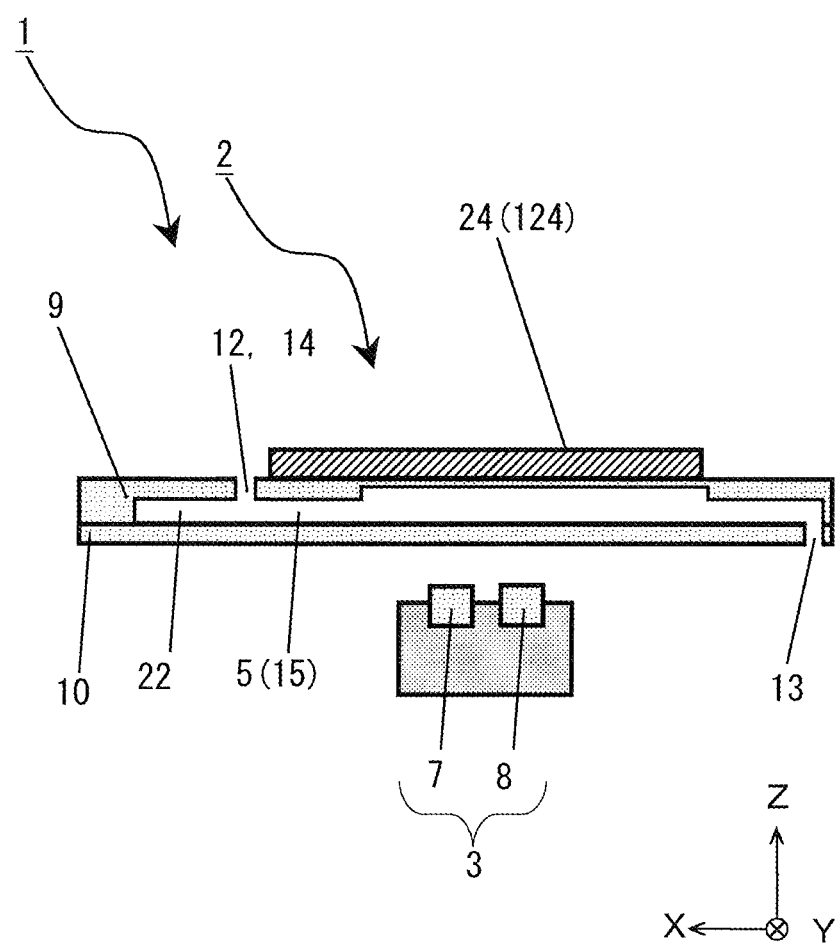
FIG. 3 illustrates a cross-sectional view showing the measurement apparatus according to the first embodiment of the present disclosure.

FIGS. 1 to 3 schematically illustrate a whole measurement apparatus 1. FIG. 1 is a top view of the measurement apparatus 1. FIG. 2 is a conceptual diagram of the measurement apparatus 1, and illustrates a relationship between constituent elements using a block diagram. FIG. 3 is a cross-sectional view of the measurement apparatus 1, and is a cross-sectional view of the measurement apparatus 1 cut along an A-A line illustrated in FIG. 1.

The measurement apparatus 1 can measure specific particles in a fluid. The measurement apparatus 1 includes a flow path device 2, an optical sensor 3, and a controller 4. A fluid (first fluid) including specific particles (first particles) flows in the flow path device 2. The optical sensor 3 is disposed to face the flow path device 2, thus can irradiate the first fluid with light and receive light passing through the first fluid (light reflected after passing through the first fluid, and then passing through the first fluid again and returning). The controller 4 can estimate the number of first particles based on an output of the optical sensor 3. The first fluid is a sample.

When the optical sensor 3 irradiates the first fluid with light, the light passing through the first fluid is dispersed or absorbed, for example, by the first particles, thus light intensity is reduced. A standard curve indicating a relationship between a sample including particles, the number of which is already known, and an attenuation amount of the light is previously prepared, and the light intensity and the standard curve are compared with each other, thus the first particles can be measured.

Figure 4:
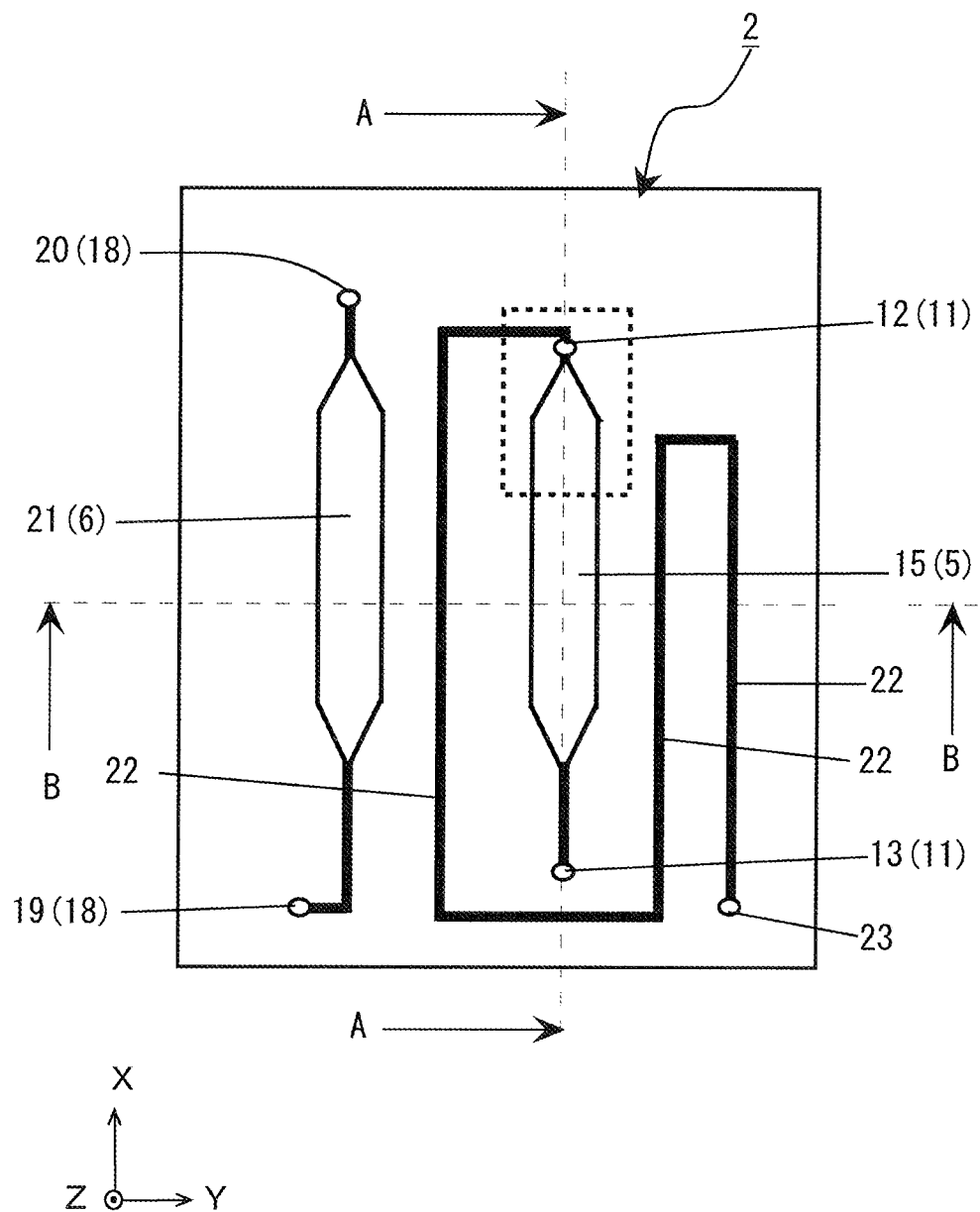
FIG. 4 illustrates a top view showing a part of the measurement apparatus according to the first embodiment of the present disclosure.

FIG. 4 schematically illustrates the flow path device 2. FIG. 4 is a view of the flow path device 2 when seen from an upper surface side transparently. An A-A line in FIG. 4 corresponds to the A-A line in FIG. 1.

The flow path device 2 is a measurement flow path for measuring the first particles in the first fluid. The flow path device 2 includes a first flow path 5 and a second flow path 6 both having translucency. The first fluid including the first particles flows in the first flow path 5. A fluid (second fluid) which does not include the first particles flows in the second flow path 6. In other words, the first flow path 5 is a flow path for measurement, and the second flow path 6 is a flow path for correction. The first fluid is a sample, and is assumed as a blood or the like, for example. The second fluid is a fluid for correction, and a saline solution or the like can be applied, for example.

The optical sensor 3 can sense the first particles. The optical sensor 3 irradiates each of the first flow path 5 and the second flow path 6 with light, and receives the light passing through each of the first flow path 5 and the second flow path 6 in the measurement. The optical sensor 3 includes a light-emitting element 7 and a light receiving element 8. The light-emitting element 7 may be a light emitting diode (LED) or a laser diode (LD), for example, and the light-emitting element 7 in the present disclosure is an LED. The light receiving element 8 may be a photo diode (PD), for example.

The controller 4 controls the measurement apparatus 1. The controller 4 compares an intensity of the light (first light) passing through the first flow path 5 and an intensity of the light (second light) passing through the second flow path 6, each of which is obtained by the optical sensor 3, thereby being able to measure the first particles. That is to say, the controller 4 calculates a difference of intensity between the first light and the second light, and compares the difference of intensity between the first light and the second light with the standard curve, thereby being able to measure the first particles.

Herein, when a conventional measurement apparatus is used repeatedly, a light-emitting element of an optical sensor is deteriorated, and the light intensity is gradually reduced. That is to say, in the case where the first particles are measured in accordance with the light intensity using a diffusion, absorption and the like of the light by the first particles with the optical sensor, when the light intensity is reduced due to the deterioration of an optical element, for example, a measurement result that the number of first particles is larger than an original number is obtained. In the meanwhile, in the measurement apparatus 1 according to the present disclosure, as described above, the first particles are measured in accordance with the difference of intensity between the first light and the second light, thus a measurement accuracy can be maintained or improved regardless of the deterioration of the optical element.

Each constituent element is described in detail hereinafter.
(Flow Path Device)

The flow path device 2 can function as a flow path for measurement as described above. The flow path device 2 has translucency to measure the first particles with the optical sensor 3. The flow path device 2 needs to have the translucency in at least a portion necessary for measuring the first flow path 5 and the second flow path 6, thus the whole flow path device 2 needs not have the translucency.

The flow path device 2 may have a plate-like shape, for example. The flow path device 2 is formed by mainly bonding a first substrate 9 and a second substrate 10. Specifically, the second flow path device 2 includes the first substrate 9 with a groove and the second substrate 10 disposed on a surface of the first substrate 9. The second substrate 10 covers an opening of the groove in the first substrate 9. That is to say, the groove of the first substrate 9 and the surface of the second substrate 10 constitute the first flow path 5 and the second flow path 6. The flow path device 2 may include a member other than the first substrate 9 and the second substrate 10.

The first substrate 9 may be a flat plate-like member, for example. A material of the first substrate 9 may be, for example, glass, an acrylic resin, a polycarbonate resin, a cyclic olefin copolymer (COC) resin, a cycloolefin polymer (COP) resin, a polydimethylsiloxane (PDMS) resin or the like. The material of the first substrate 9 in the present disclosure is PDMS. A refraction index of the first substrate 9 is set to equal to or larger than 1.4 and equal to or smaller than 1.6, for example.

A width of the groove of the first substrate 9 may be equal to or larger than 500 μm (0.5 mm) and equal to or smaller than 4000 μm (4 mm), for example. A depth of the groove may be equal to or larger than 100 μm (0.1 mm) and equal to or smaller than 1000 μm (1 mm), for example. The first substrate 9 and the groove of the first substrate 9 can be formed by a conventionally known method. A thickness of the first substrate 9 from a bottom surface of the groove is set to equal to or larger than 0.5 mm and equal to or smaller than 1 mm, for example. In the flow path device 2 in the present disclosure, the width and depth of the groove of the first substrate 9 are the same as a width and height of each of the first flow path 5 and the second flow path 6.

The second substrate 10 may be a flat plate-like member, for example. A material of the second substrate 10 may be, for example, glass, an acrylic resin, a polycarbonate resin, a polydimethylsiloxane (PDMS) resin or the like. A refraction index of the second substrate 10 is set to equal to or larger than 1.4 and equal to or smaller than 1.6, for example. The material of the second substrate 10 in the present disclosure is glass. The second substrate 10 can be formed by a conventionally known method. A thickness of the second substrate 10 is set to equal to or larger than 0.5 mm and equal to or smaller than 1 mm, for example. The thickness of the second substrate 10 is set smaller than that of the first substrate 9.

Any of the first substrate 9 and the second substrate 10 may be located on an upper side, however, in the flow path device 2 in the present disclosure, the first substrate 9 is disposed on an upper surface of the second substrate 10.

Figure 5:
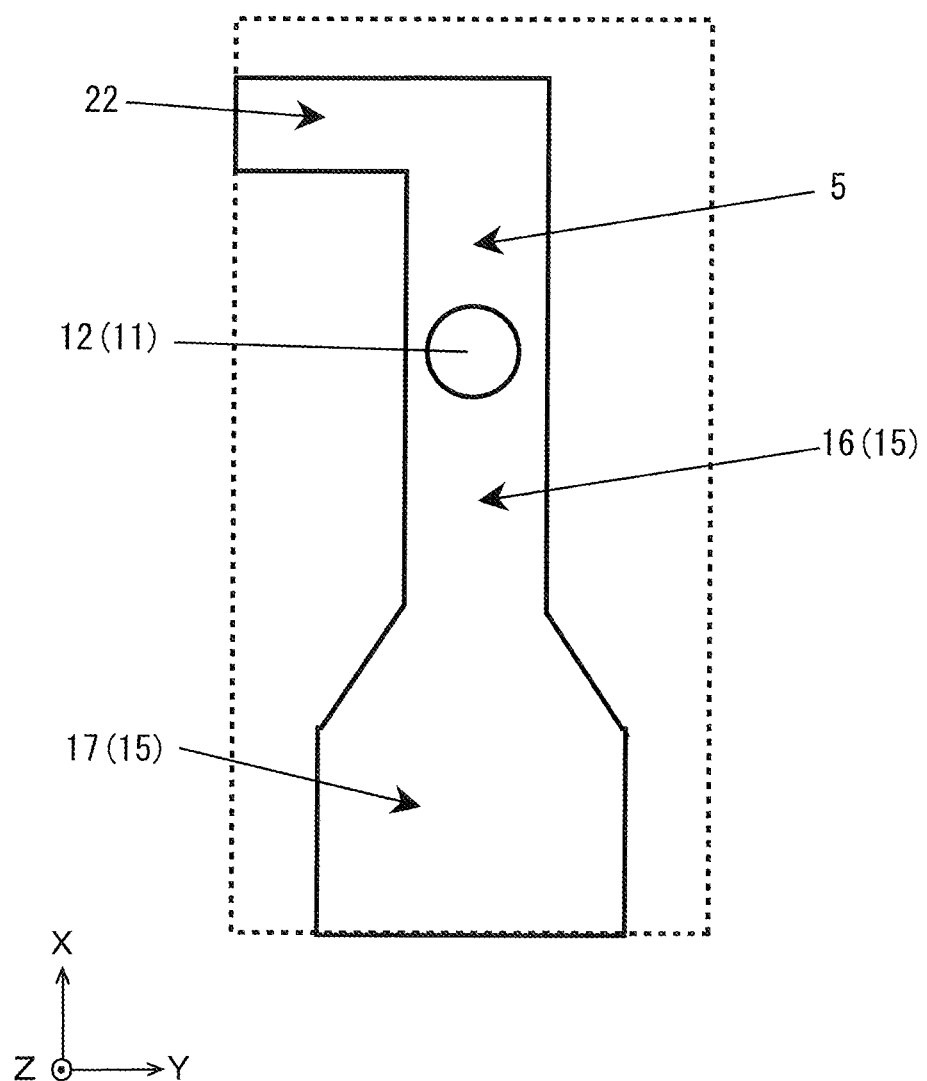
FIG. 5 illustrates a top view showing a part of the measurement apparatus according to the first embodiment of the present disclosure.

FIG. 5 schematically illustrates a part of the flow path device 2. FIG. 5 is an enlarged view of a broken line section illustrated in FIG. 4.

The first flow path 5 is a flow path into which at least the first fluid flows. The first flow path 5 includes a plurality of first openings 11 located in both surfaces of the flow path device 2. The plurality of first openings 11 may be openings through which the fluid flows in and flows out, at least. The plurality of first openings 11 include a first flow inlet 12 disposed on an upper surface of the flow path device 2 (the upper surface of the first substrate 9) and a first flow outlet 13 disposed on a lower surface of the flow path device 2 (a lower surface of the second substrate 10). The first flow inlet 12 is an opening through which the fluid flows into the first flow path 5. The first flow outlet 13 is an opening through which the fluid flows from the first flow path 5.

The first flow path 5 further includes a vertical part 14 connected to the first flow inlet 12 and extending in a thickness direction of the first substrate 9 and a planar part 15 connected to the vertical part 14 and extending along one direction of a planar surface of the flow path device 2. The vertical part 14 is a through hole formed in the first substrate 9. The planar part 15 is a groove formed in the first substrate 9. A cross-sectional surface (a cross-sectional surface perpendicular to a moving direction of the fluid) of the planar part 15 may have a rectangular shape, for example.

The planar part 15 may further include a first planar part 16 connected to the vertical part 14 and a second planar part 17 connected to the first planar part 16 and having a width larger than the first planar part 16. A connection part between the first planar part 16 and the second planar part 17 is gradually widened. A region irradiated with light by the light-emitting element 7 of the optical sensor 3 (irradiated region) is the second planar part 17.

The second planar part 17 may have a height larger than the first planar part 16. As a result, the first particles can be easily diffused. A height of the first planar part 16 may be equal to or larger than 0.2 mm and equal to or smaller than 1 mm, for example. The height of the second planar part 17 may be equal to or larger than 1 mm and equal to or smaller than 5 mm, for example.

The second flow path 6 is a flow path into which at least the second fluid flows. The second flow path 6 includes a plurality of second openings 18 located in both surfaces of the flow path device 2. The plurality of second openings 18 may be openings through which the fluid flows in and flows out, at least. The plurality of second openings 18 include a second flow inlet 19 disposed on the upper surface of the flow path device 2 (the upper surface of the first substrate 9) and a second flow outlet 20 disposed on the lower surface of the flow path device 2 (a lower surface of the second substrate 10).

The second flow path 6 further includes a vertical part (not shown) connected to the second flow inlet 19 and extending in a thickness direction of the first substrate 9 and a third planar part 21 connected to the vertical part and extending along one direction of a planar surface of the flow path device 2. It is sufficient that a part of the third planar part 21 in the second flow path 6 has the same shape as at least the second planar part 17 in the first flow path 5, for example. It is sufficient that a position of the part of the third planar part 21 having the same shape as the second planar part 17 in a thickness direction is the same as that in the first flow path 5, for example. The shape and position of the second flow path 6 may not be the same as those of the first flow path 5 as long as the second flow path 6 can function as the path for correction.

The flow path device 2 may further include, in addition to the first flow path 5, a third flow path 22 connected to the first flow path 5. The third flow path 22 may be connected to the planar part 15 of the first flow path 5. The third flow path 22 has a function of sweeping away a sample reaching the planar part 15 by flowing gas, for example. As a result, the retention of the sample in the first flow path 5 (the planar part 15) can be reduced.

In the flow path device 2 in the present disclosure, the third flow path 22 is located to be connected to the connection part between the vertical part 14 and the planar part 15 in the first flow path 5. The third flow path 22 includes a third opening 23 located on the surface of the flow path device 2 (in the present disclosure, the upper surface of the first substrate 9). The third opening 23 is an opening through which an extrusion fluid for sweeping away the sample is flowed in.

The flow path device 2 in the present disclosure may further include a mirror 24 which is a reflection member disposed in a region overlapping the first flow path 5 and the second flow path 6 on the upper surface of the first substrate 9. The mirror 24 can reflect a part of light emitted from the light-emitting element 7 in the optical sensor 3 passing through each of the first flow path 5 and the second flow path 6 to the light receiving element 8 in the optical sensor 3.

In the flow path device 2, the mirror 24 is disposed, as the reflection member reflecting the light emitted from the optical sensor 3 toward the optical sensor 3, in a region overlapping the first flow path 5 and the second flow path 6 on an opposite side of the optical sensor 3 for the first flow path 5 and the second flow path 6, thus the light emitted from the optical sensor 3 can be efficiently received in the optical sensor 3 through the first flow path 5 and the second flow path 6. Disturbance light entering the first flow path 5 and the second flow path 6 from an opposite side of the optical sensor 3 can be blocked by the mirror 24, thus an accuracy of the measurement by the optical sensor 3 can be enhanced.

The mirror 24 may be a thin film-like member, for example. It is sufficient that a material of the mirror 24 has a refraction index different from the first substrate 9. The mirror 24 may be formed of a metal material such as aluminum or gold or a laminated body of a dielectric material such as a dielectric multilayer filter, for example. A refraction index of the mirror 24 is set to equal to or larger than 1.4 and equal to or smaller than 1.6, for example. The mirror 24 can be formed on the upper surface of the first substrate 9 by a vapor deposition method, a sputtering method or the like, for example.

In the present disclosure, the mirror 24 is disposed to overlap the first flow path 5 and the second flow path 6 as described hereinafter, however, the mirror 24 is not limited to an integrated body covering both the first flow path 5 and the second flow path 6, but the mirrors 24 may be disposed separately to overlap each of the first flow path 5 and the second flow path 6. When the mirrors 24 are separately disposed, a light shielding member may be disposed between the mirrors 24 to block the disturbance light. A non-reflection member or a light shielding member is disposed on the mirror 24 for preventing a transmission from the mirror 24 and the disturbance light entering the mirror 24 to reliably obtain the effect of blocking the disturbance light using the mirror 24.

The flow path device 2 in the present disclosure may include a non-reflection member 124 which does not reflect the light emitted from the optical sensor 3 in a region overlapping the first flow path 5 and the second flow path 6 on the opposite side of the optical sensor 3 for the first flow path 5 and the second flow path 6 in place of the mirror 24. The non-reflection member 124 is disposed, thus part of the light from the optical sensor 3 reflected by the first particles included in the first flow path 5 or part of the light reflected by an interface of each of the first flow path 5 and the second flow path 6 (a ceiling surface seen from a side of the optical sensor 3) can be received in the optical sensor 3. Accordingly, the reflection from the interface can be measured and a DC offset can be optically performed, and the light reflected by the first particles can be successfully received. The disturbance light entering the first flow path 5 and the second flow path 6 from the opposite side of the optical sensor 3 can be reliably blocked by the non-reflection member 124, thus the accuracy of the measurement by the optical sensor 3 can be enhanced by removing an optical noise. A non-reflection cloth or the like, for example, can be adopted as the non-reflection member 124. A matte coating of black color or the like may be applied as the non-reflection member 124.

When the non-reflection member 124 is disposed in place of the mirror 24, the non-reflection member 124 is preferably made up of an integrated body covering both the first flow path 5 and the second flow path 6 over a whole region measured by the optical sensor 3.

Figure 7A:
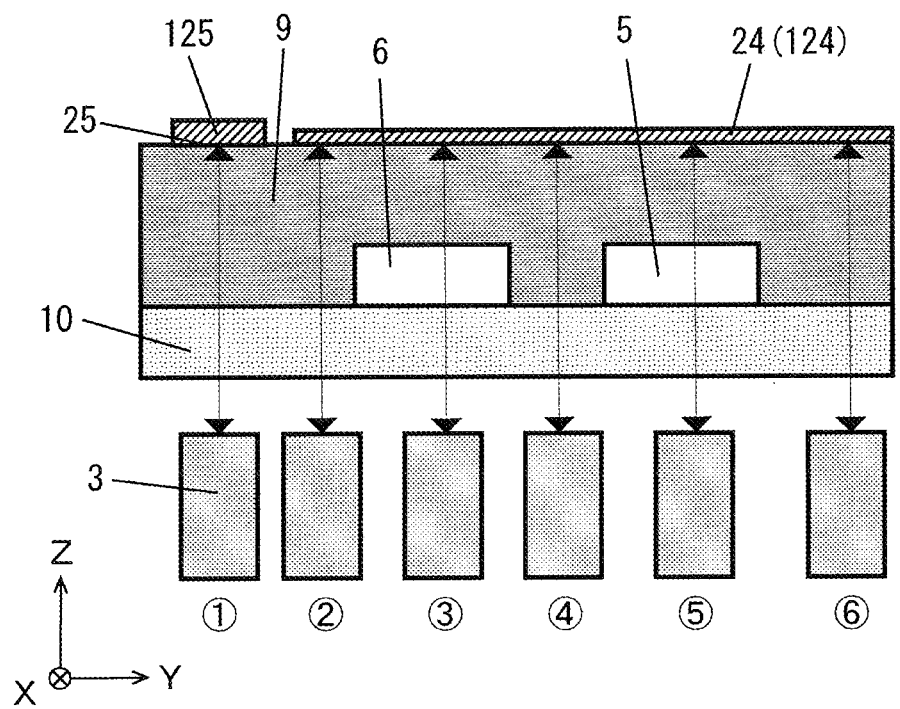
FIG. 7A illustrates a cross-sectional view showing the measurement apparatus according to the first embodiment of the present disclosure.

The flow path device 2 in the present disclosure may include a non-reflection region 25 as illustrated in FIG. 7A. The non-reflection region 25 indicates a part of the flow path device 2 where the first flow path 5 and the second flow path 6 are not located and a region where the mirror 24 is not disposed in a top view. A reference non-reflection member 125 which does not reflect the light emitted from the optical sensor 3 may be disposed in the non-reflection region 25. The reference non-reflection member 125 can be used for the correction on the light receiving element 8 of the optical sensor 3, and serves as a standard in the measurement by the optical sensor 3. The intensity of the reflected light from the reference non-reflection member 125 is used as a standard, thus an influence of noise occurring at the time of using the optical sensor 3 can be reduced. A non-reflection cloth, for example, may be disposed as the reference non-reflection member 125, and a matte coating of black color or the like may be applied to form the reference non-reflection member 125.

Figure 8:
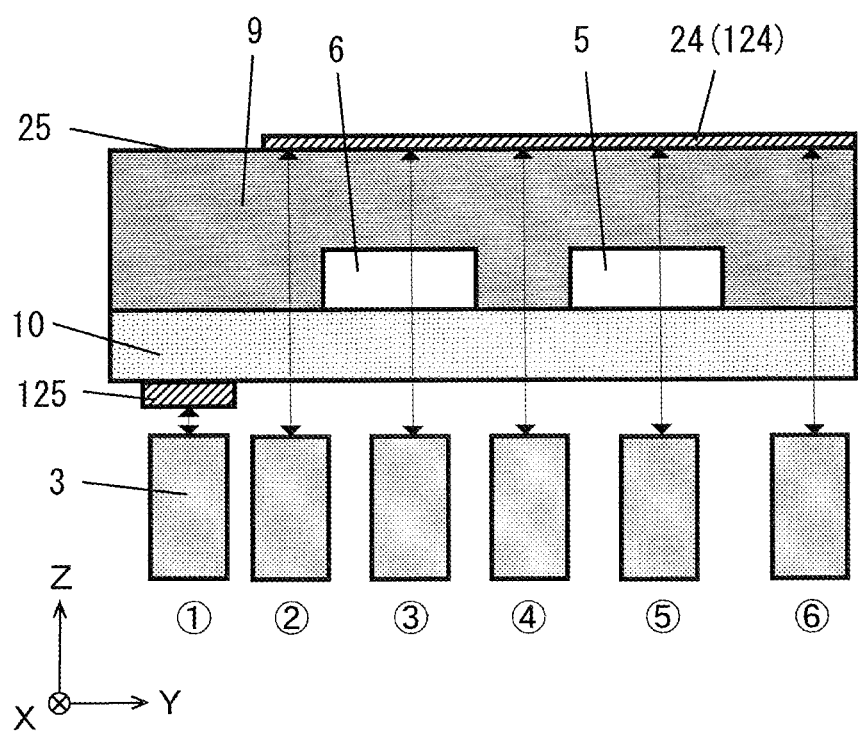
FIG. 8 illustrates a cross-sectional view showing the measurement apparatus according to the first embodiment of the present disclosure.

As illustrated in FIG. 8, the reference non-reflection member 125 may be disposed on the lower surface of the second substrate 10 in a region corresponding to the non-reflection region 25 but not overlapping the first flow path 5 and the second flow path 6. Also in this case, the intensity of the reflected light from the reference non-reflection member 125 is used as a standard, thus an influence of noise occurring at the time of using the optical sensor 3 can be reduced.

The measurement apparatus 1 in the present disclosure further includes a first pump 26 supplying the fluid to the first flow path 5, a second pump 27 supplying the fluid to the second flow path 6, and a third pump 28 supplying air (also referred to as gas hereinafter) to the third flow path 22. The first pump 26, the second pump 27, and the third pump 28 lead to the first opening 11, the second opening 18, and the third opening 23, respectively, via a plurality of other flow paths (not shown) such as tubes, for example.

(Optical Sensor)

FIG. 6 schematically illustrates the optical sensor 3. FIG. 6 is an enlarged view of the optical sensor 3 illustrated in FIG. 3.

The optical sensor 3 is a sensor for measuring the first particles. The optical sensor 3 includes the light-emitting element 7 and the light receiving element 8 as described above. The light receiving element 8 in the present disclosure includes a semiconductor substrate 29 including one conductive type region 29a and the other conductive type region 29b on an upper surface thereof and a pair of first electrodes 30. The light-emitting element 7 in the present disclosure includes a plurality of semiconductor layers 31 located away from a part of the semiconductor substrate 29 functioning as the light receiving element 8 and a pair of second electrodes 32.

The optical sensor 3 is disposed to be able to move in a planar surface direction (for example, ±Y direction) on the surface of the flow path device 2. As a result, the measurement apparatus 1 can irradiate the first flow path 5 and the second flow path 6 with the light in sequence while moving the optical sensor 3, thus can measure the intensity of the light on each path. The optical sensor 3 in the present disclosure is located on a lower side of the flow path device 2.

(Controller)

The controller 4 can control the measurement apparatus 1. Specifically, the controller 4 can also control driving of the optical sensor 3, the first pump 26, the second pump 27, and the third pump 28, for example. The controller 4 can drive the first pump 26 to flow the fluid into the first flow path 5. The controller 4 can drive the second pump 27 to flow the fluid into the second flow path 6. The controller 4 can drive the third pump 28 to flow the gas into the third flow path 22. The controller 4 is made up of a combination of various circuits.

Figure 7B:
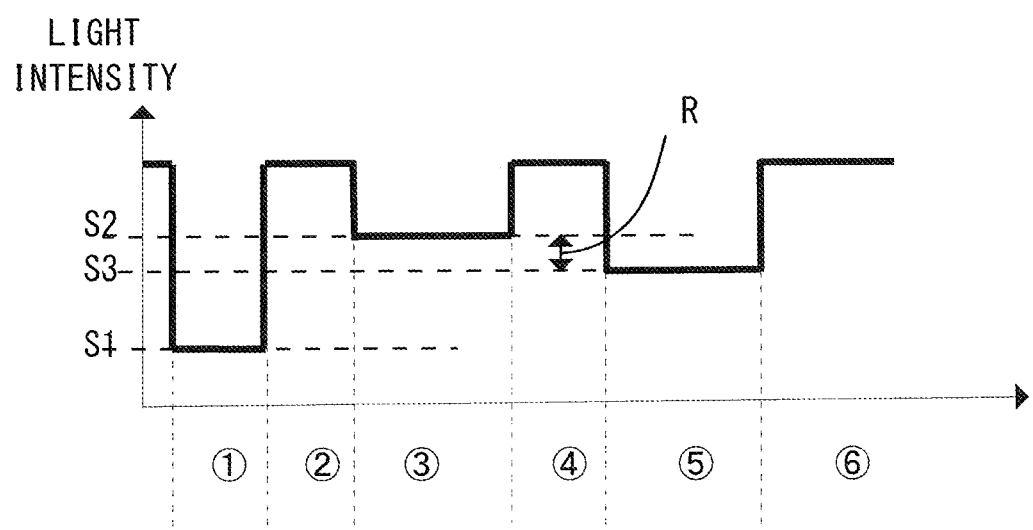
FIG. 7B illustrates a drawing describing a system of the measurement according to the first embodiment of the present disclosure.

FIGS. 7A and 7B schematically illustrate the measurement apparatus 1. FIG. 7A is a cross-sectional view of the measurement apparatus 1 cut along a B-B line illustrated in FIG. 1 and FIG. 4. FIG. 7B is a drawing describing a system of the measurement.

The controller 4 can calculate a measurement result based on an output result of the optical sensor 3. As described above, the controller 4 can measure the first particles by comparing the intensity of the light passing through the first flow path 5 and the intensity of the light passing through the second flow path 6.

The optical sensor 3 measures the intensity of the light corresponding to the reference non-reflection member 125 in the non-reflection region 25, and outputs a reference signal S1 as a correction signal (a circled number 1 in FIGS. 7A and 7B). Next, the optical sensor 3 measures the intensity of the light passing through the first substrate 9 and the second substrate 10 in a portion before reaching the second flow path 6 (the reflected light from the mirror 24 or the non-reflection member 124), however, this process is not particularly necessary for the measurement (a circled number 2 in FIGS. 7A and 7B). Next, the optical sensor 3 measures the intensity of the light passing through the second flow path 6 (the reflected light from the mirror 24 or the non-reflection member 124), and outputs a measurement signal S2 (a circled number 3 in FIGS. 7A and 7B). The measurement signal S2 is a signal which can be used as a correction signal S2 when the reference signal S1 is not used. Next, the optical sensor 3 measures the intensity of the light passing through the first substrate 9 and the second substrate 10 in a portion between the second flow path 6 and the first flow path 5 (the reflected light from the mirror 24 or the non-reflection member 124), however, this process is not particularly necessary for the measurement (a circled number 4 in FIGS. 7A and 7B). Next, the optical sensor 3 measures the intensity of the light passing through the first flow path 5 (the reflected light from the mirror 24 or the non-reflection member 124, however, in a case where the non-reflection member 124 is disposed, substantially the light other than the light not reflected by the non-reflection member 124 such as the reflection light from the first particles and the interface (the ceiling surface) of the first flow path 5, for example), and outputs a measurement signal S3 (a circled number 5 in FIGS. 7A and 7B). Next, the optical sensor 3 measures the intensity of the light passing through the first substrate 9 and the second substrate 10 in a portion after passing through the first flow path 5 (the reflected light from the mirror 24 or the non-reflection member 124), however, this process is not also particularly necessary for the measurement (a circled number 6).

Calculated next is a measurement value R (=(S2−S1)−(S3−S1)=S2−S3) obtained by subtracting a difference between the measurement signal S3 on the first flow path 5 and the reference signal S1 (S3−S1) from a difference between the measurement signal S2 on the second flow path 6 and the reference signal S1 (S2−S1). Then, the measurement value R and the value of the standard curve previously stored in the controller 4 are compared with each other, thus the number of first particles in the first fluid in the first flow path 5 can be estimated.

The system of the measurement described above is similar to that in a case where the reference non-reflection member 125 is disposed on a side of the optical sensor 3 of the flow path device 2 (the lower surface of the second substrate 10) as illustrated in FIG. 8.

Herein, when the difference between the reference signal S1 and the measurement signals S2 and S3 corresponding to a light loss caused by a measured object is sufficiently large, it is applicable to locate the mirror 24 which is the reflection member, however, when the difference therebetween is small, the accurate measurement is hardly performed in some cases. Considered as a measure against the above state is that the light output of the light-emitting element 7 in the optical sensor 3 is increased or an amplification factor of the signal is increased after the light receiving element 8 receives the light. However, the light output of the light-emitting element 7 cannot be increased easily in many cases, and there are a limitation and the like by an amplifier circuit in increasing the amplification factor of the signal, so that an amplification range is limited. Also considered is a method of subtracting a certain output in a circuit of a signal process and then performing an amplification, however, in subtracting the certain output, a noise component remains as it is although the signal gets small accordingly, thus there is a problem that the noise component is amplified more after the amplification.

In contrast, according to the measurement apparatus 1 and the measurement method in the present disclosure described above, the optical signal is optically subtracted in measuring the light output, thus light, which has passed outside through the flow path device 2, reflected and returning and external light entering as disturbance light can be effectively suppressed. Accordingly, a setting of a DC offset can be optically performed in the measurement, extra light emitted from outside can be blocked, and a stable measurement can be performed on the flow path device 2. As a result, the accurate measurement can be stably performed.

According to the measurement apparatus 1 and the measurement method in the present disclosure, the reference non-reflection member 125, the first flow path 5, and the second flow path 6 are integrally disposed and the measurement is performed while moving the optical sensor 3 to scan them, thus a desired signal and data can be obtained by one measurement in a short time, and a measurement error caused by an output fluctuation of the light-emitting element 7 and the like, for example, can be reduced.

In a case where a calculation of the signal in the controller 4 is performed with a light loss (dB) of −10×log (measurement signal/reference signal), for example, a calculation result is hardly influenced and does not change even when the emission intensity of the light-emitting element 7 is changed to an appreciable degree, thus is also hardly influenced by the deterioration of the light-emitting element 7 in a long-term use, and the stable measurement can be achieved.

The signals of the circled numbers 2, 4, and 6 described in the system of the measurement described above are compared with each other or compared with the reference signal S1 and the measurement signals S2 and S3, thus also achievable is the confirmation whether the flow path device 2 and the optical sensor 3 are disposed relatively in a correct position at a correct angle.

The data of the standard curve (standard data) needs not necessarily be stored in the controller 4. For example, also applicable is that the data is recorded in the other storage medium connected to the controller via network and drawn out with an access to the storage medium for each measurement.

When the controller 4 obtains the correction signal S2, the controller 4 may compare the correction signal S2 with a correction signal of the second fluid in the standard data. As a result, when there is a large difference between these signals, it is determined that a defect occurs in the measurement. As a result, the above configuration helps with the collection of only the accurate measurement data.

For each measurement, the optical sensor 3 may irradiate each of the first flow path 5 and the second flow path 6 with the light, and receive the light passing through each of the first flow path 5 and the second flow path 6. The controller 4 may compare the intensity of the light passing through the first flow path 5 and the intensity of the light passing through the second flow path 6 for each measurement. As a result, for example, when microparticles such as white blood cells (leucocytes) in blood are measured, a slight fluctuation of the light output causes a large influence on the measurement result, thus the above configuration can improve the measurement accuracy of the microparticles.

The controller 4 may output an error signal when the correction signal S2 is lower than an optional reference value at the time of obtaining the correction signal S2. As a result, the controller 4 can inform a length of life of the light-emitting element 7 of the optical sensor 3, for example. A value obtained by subtracting a constant value from a correction signal of the second fluid in the standard data may be adopted as the reference value.

The controller 4 may return the optical sensor 3 to an original position after the optical sensor 3 outputs each of the signals S1, S2, and S3. The controller 4 needs not return the optical sensor 3 to an original position after the optical sensor 3 outputs each of the signals S1, S2, and S3. When the controller 4 does not return the optical sensor 3 to the original position, the controller 4 may perform the next measurement from an opposite direction.

The controller 4 may turn off the optical sensor 3 while moving the optical sensor 3 after turning on the optical sensor 3 and making the optical sensor 3 output each of the signals S1, S2, and S3. The controller 4 may pulse-drive and blink the optical sensor 3 during the measurement. As a result, the deterioration of the light-emitting element 7 of the optical sensor 3 can be reduced compared with the case of continuously turning on the optical sensor 3.

The controller 4 may drive the third pump 28 to eject the first fluid after finishing the measurement. The finish of the measurement may be determined when the optical sensor 3 outputs each of the signals S1, S2, and S3. The finish of the measurement may be determined when the optical sensor 3 starts moving with respect to the flow path device 2 and returns to the original position. The finish of the measurement may be determined by making the optical sensor 3 measure the non-reflection region 25, the first flow path 5, and the second flow path 6 and then measure the non-reflection region 25 again. The finish of the measurement may be determined after an elapse of a certain period of time of driving the optical sensor 3.

The controller 4 may drive the third pump 28 after an elapse of a certain period of time of driving the first pump 26. As a result, the fluid flowing into the first flow path 5 by driving the first pump 26 can be moved and conveyed in the first flow path 5 by flowing gas into the first flow path 5 via the third flow path 22 by driving the third pump 28. As a result, the fluid in the first flow path 5 moves fast, and the measurement efficiency can be improved.

The controller 4 may change a pressure of the gas in the third flow path 22 using the third pump 28 after the fluid flows into the first flow path 5. As a result, the first fluid flowing into the first flow path 5 can be stirred and the first particles in the first fluid can be stirred. The measurement accuracy can be improved by stirring the first particles.

It is also applicable that the controller 4 confirms the first fluid flowing into the first flow path 5 using the optical sensor 3, and then stirs the first fluid using the third pump 28 to start stirring the first particles. As a result, leaking of the first fluid in the first flow path 5 from the third flow path 22 due to an excessive reduction in the pressure in the first flow path 5 can be reduced by the third pump 28. Specifically, when the first particles flow into the first flow path 5, the measurement signal S3 of the optical sensor 3 is smaller than the case where no first particle is included, thus it may be determined that the first fluid flows into the first flow path 5 when the measurement signal S3 gets small.

The controller 4 may stir the first fluid after an elapse of a certain period of time of driving the first pump 26 to start stirring the first particles. In this case, the deterioration of the light-emitting element 7 can be reduced. In this case, a start position of stirring the first particles may be located in front of the region irradiated with light by the light-emitting element 7 (the irradiated region). In this case, it is also applicable that the gas is made to flow into the first flow path 5 via the third flow path 22 using the third pump 28 after the stirring of the first particles is finished to push the first fluid to the region irradiated with light by the light-emitting element 7 (the irradiated region).

The controller 4 may drive the optical sensor 3 while changing a pressure in the first flow path 5 using the third pump 28. That is to say, it is also applicable to stop the pump leading to the first flow path 5 and the third flow path 22 and drive the third pump 28. As a result, it can be confirmed whether the first particles are stirred. That is to say, when the first particles are collected, the measurement signal S3 gets small, and when the first particles are stirred and are not collected, the measurement signal S3 gets large in some cases. Accordingly, when it is confirmed that the fluctuation of the measurement signal S3 is within a certain range, it can be confirmed whether the first particles are stirred. Specifically, it is applicable that when a difference between the latest measurement signal S3 (or the measurement value R) and the same index of the immediately preceding five signals is equal to or smaller than ±5%, the stirring of the first particles is determined to be completed, for example.

The controller 4 may make the optical sensor 3 stand by in a position of measuring the first flow path 5 during the stirring of the first particles. As a result, the measurement efficiency can be improved.

When the controller 4 makes the optical sensor 3 stand by during the stirring of the first particles, the controller 4 may blink the optical sensor 3. As a result, the deterioration of the light-emitting element 7 can be reduced.

When the controller 4 makes the optical sensor 3 stand by during the stirring of the first particles, the controller 4 preferably measures the second flow path 6 after completing the stirring of the first particles. As a result, the measurement accuracy can be improved.

The controller 4 may stir the first fluid using the third pump 28 and flow the second fluid into the second flow path 6 using the second pump 27. That is to say, the controller 4 may drive the second pump 27 to flow the second fluid into the second flow path 6 before completing the stirring of the first particles. As a result, the measurement efficiency can be improved. The second pump 27 may be driven at the same time as the first pump 26 or the third pump 28, or may be driven earlier than the first pump 26 and the third pump 28.

Second Embodiment (Measurement Apparatus 1A)

A measurement apparatus 1A as a second embodiment according to the present disclosure is described hereinafter.

Figure 10:
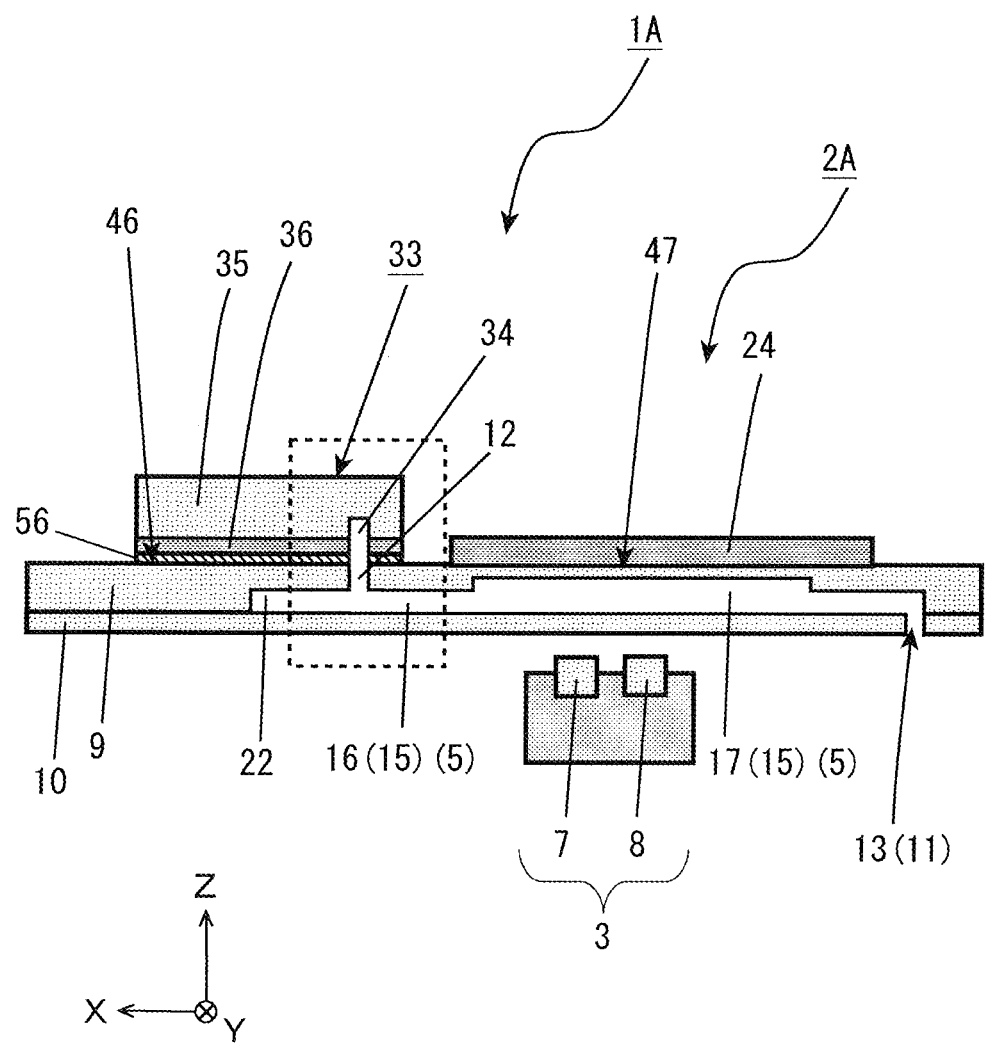
FIG. 10 illustrates a cross-sectional view showing the measurement apparatus according to the second embodiment of the present disclosure.
Figure 11:
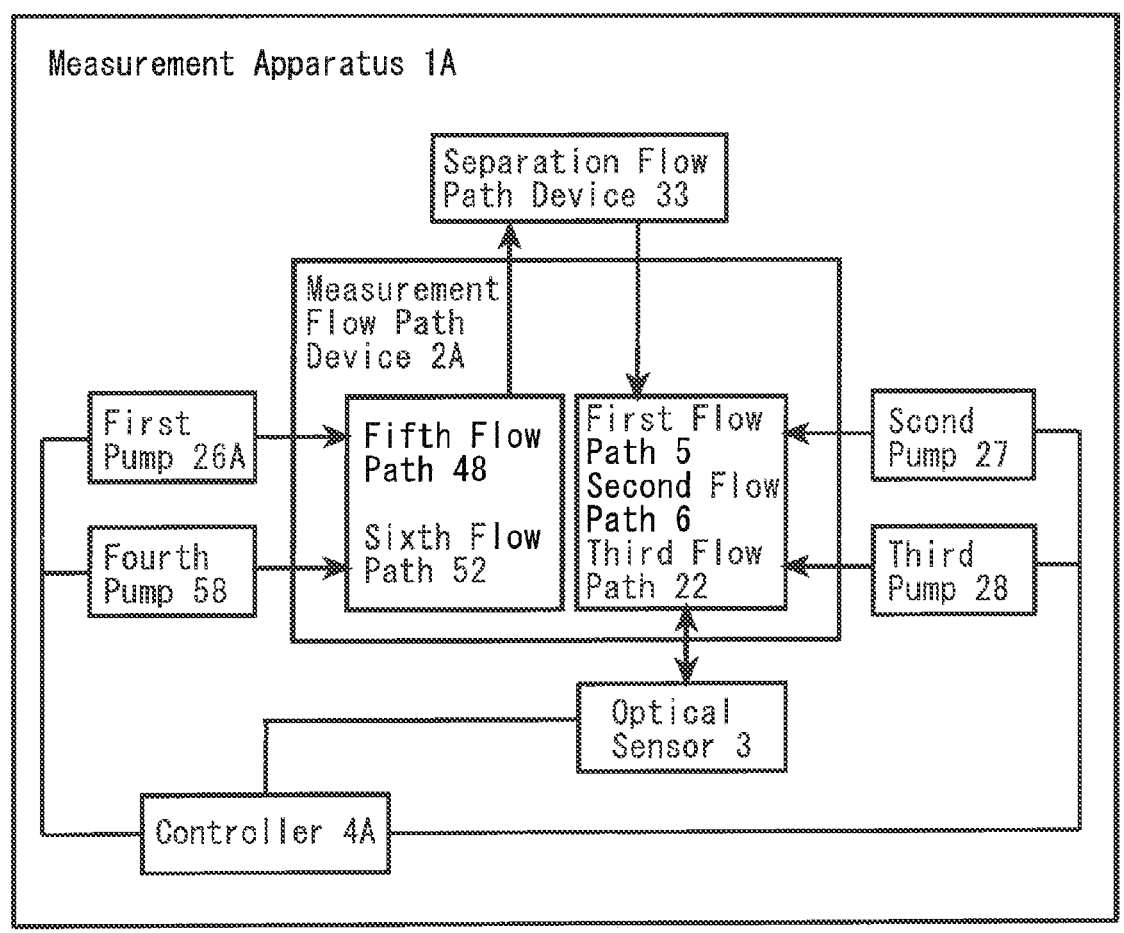
FIG. 11 illustrates a block diagram schematically showing a configuration of the measurement apparatus according to the second embodiment of the present disclosure.

FIGS. 9 and 10 schematically illustrate a whole measurement apparatus 1A. FIG. 9 is a top view of the measurement apparatus 1A. FIG. 10 is a cross-sectional view of the measurement apparatus 1A, and is a cross-sectional view of the measurement apparatus 1A cut along the A-A line illustrated in FIG. 9. FIG. 11 is a conceptual diagram of the measurement apparatus 1A, and illustrates a relationship between constituent elements using a block diagram.

The measurement apparatus 1A further includes a separation flow path device 33 located on the upper surface of the flow path device 2A. The separation flow path device 33 is a flow path for separating and taking specific particles out of the sample to select them. The measurement apparatus 1A includes the flow path device 2A and the separation flow path device 33, thus can separate and select the first particles, which is to be measured, from the sample through a continuous process, and a working efficiency can be improved. In the description of the second embodiment hereinafter, the flow path device 2A is referred to as the "measurement flow path device 2A".

Figure 12:
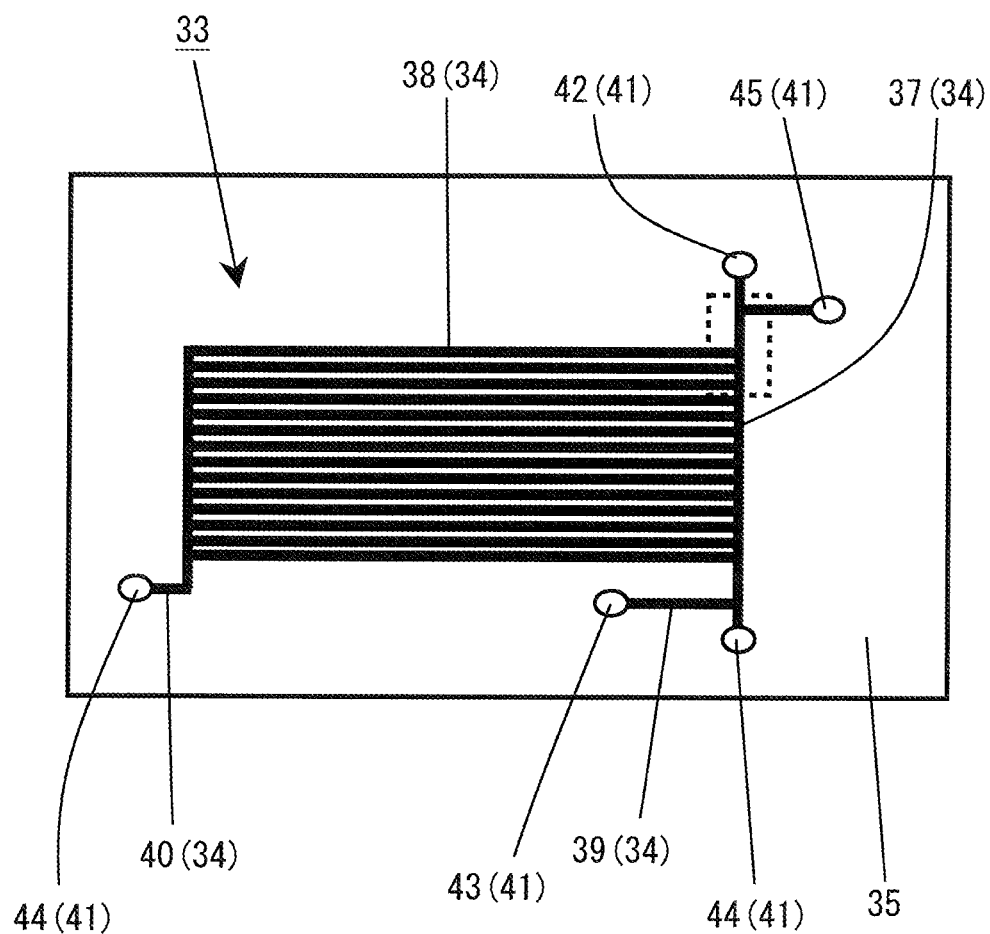
FIG. 12 illustrates a top view showing a part of the measurement apparatus according to the second embodiment of the present disclosure.
Figure 13:
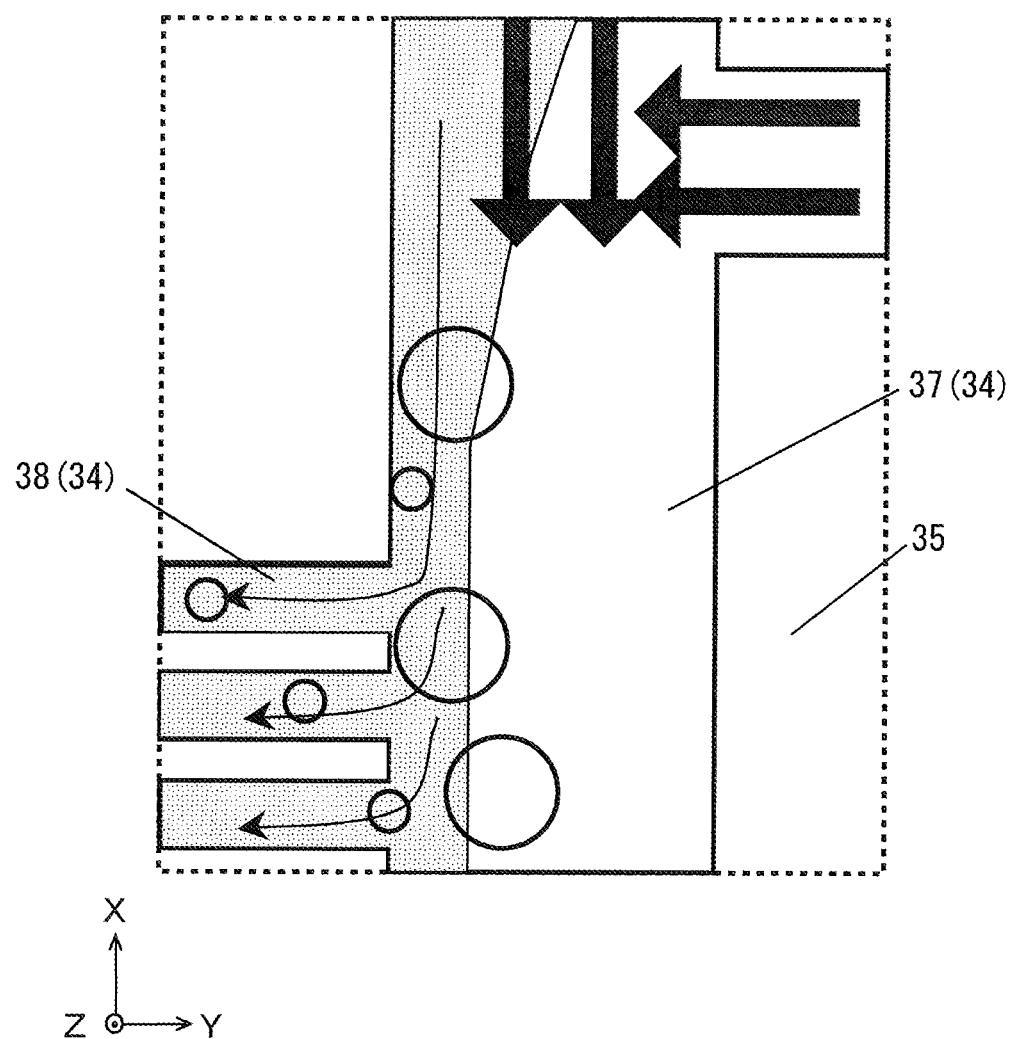
FIG. 13 illustrates a top view showing a part of the measurement apparatus according to the second embodiment of the present disclosure.

FIG. 12 and FIG. 13 schematically illustrate the separation flow path device 33. FIG. 12 is a view of the separation flow path device 33 when seen from an upper surface side transparently. FIG. 13 is an enlarged view of a broken line section illustrated in FIG. 12.

(Separation Flow Path Device)

The separation flow path device 33 can separate microparticles, select the microparticles to take the microparticles out of a sample, and recover the microparticles. The separation flow path device 33 includes a fourth flow path 34. As a result, the microparticles can be separated and recovered.

The separation flow path device 33 may have a plate-like shape, for example. For example, a planar shape of the separation flow path device 33 is a rectangular shape, and a surface thereof is a flat surface. A thickness of the separation flow path device 33 may be equal to or larger than 1 mm and equal to or smaller than 5 mm, for example. The planar shape of the separation flow path device 33 may have a short side with a length equal to or larger than 10 mm and equal to or smaller than 30 mm and a long side with a length equal to or larger than 10 mm and equal to or smaller than 50 mm, for example. The separation flow path device 33 can be molded by injection molding, for example.

The separation flow path device 33 is formed mainly of a third substrate 35 and a fourth substrate 36. Specifically, the separation flow path device 33 includes the third substrate 35 with a groove and the fourth substrate 36 located on a surface of the third substrate 35. The fourth substrate 36 covers an opening of the groove in the third substrate 35. That is to say, the groove of the third substrate 35 and the surface of the fourth substrate 36 constitute the fourth flow path 34. The separation flow path device 33 may include a member other than the third substrate 35 and the fourth substrate 36.

The third substrate 35 and the fourth substrate 36 may be a flat plate-like member, for example. A material of the third substrate 35 and the fourth substrate 36 may be, for example, glass, an acrylic resin, a polycarbonate resin, a polydimethylsiloxane (PDMS) resin or the like. The material of the third substrate 35 and the fourth substrate 36 in the present disclosure is PDMS.

Any of the third substrate 35 and the fourth substrate 36 may be located on an upper side, however, in the separation flow path device 33 in the present disclosure, the third substrate 35 is located on an upper surface of the fourth substrate 36.

The fourth flow path 34 includes a fourth main flow path 37 and a fourth branch flow path 38 branching from the fourth main flow path 37. In the separation flow path device 33 according to the present disclosure, the fluid flowing in the separation flow path device 33 flows into the fourth main flow path 37, and only microparticles (second particles) different from the specific microparticles (first particles) flow from the fourth main flow path 37 into the fourth branch flow path 38, thus the specific microparticles are separated and recovered, and the separated specific microparticles can be included in the sample. Only the specific microparticles flow into the fourth branch flow path 38, thus the specific microp articles can be separated toward a side of the fourth branch flow path 38 and recovered.

The fourth branch flow path 38 is designed so that only the second particles are branched, however, only the second particles are not necessarily branched. That is to say, microparticles different from the second particles may flow into the fourth branch flow path 38 in some cases.

FIG. 13 schematically illustrates a separation of the first particles and the second particles. A large circle in FIG. 13 indicates the first particle and a small circle indicates the second particle. A thick arrow along an X axis direction indicates a main stream and a thick arrow along a Y axis direction indicates a "pressing flow" described hereinafter. A hatched region in FIG. 13 indicates a "lead-in flow" described hereinafter.

The fourth flow path 34 in the present disclosure includes one fourth main flow path 37 and the plurality of fourth branch flow path 38 connected to one side of the one fourth main flow path 37. In the separation flow path device 33, a sectional area and length of each of the fourth main flow path 37 and the fourth branch flow path 38 and a flow rate of the sample are adjusted, thus the "lead-in flow", which flows from the fourth main flow path 37 into the fourth branch flow path 38 can be generated in the fourth main flow path 37. The separation flow path device 33 generates the pressing flow, which can press the sample flowing in the fourth main flow path 37 against the side of the fourth branch flow path 38, in the fourth flow path 34. As a result, as illustrated in FIG. 13, a width of lead-in flow is set to larger than a barycentric position of the specific microparticle flowing in the sample and smaller than a barycentric position of the other microparticle, thus predetermined microp articles (the second particles herein) can be lead in the fourth branch flow path 38.

The separation flow path device 33 in the present disclosure is particularly intended to separate red blood cells (erythrocyte) and white blood cells (leukocyte) in blood. A barycentric position of the red blood cell in the blood is located 2 to 2.5 μm from an edge thereof, for example, and a barycentric position of the white blood cell is 5 to 10 μm from an edge thereof, for example. In this case, the fourth main flow path 37 may have the sectional area ranging from 300 μm$^2$ to 1000 μm$^2$ and the length ranging from 0.5 mm to 20 mm, for example. The fourth branch flow path 38 may have the sectional area ranging from 100 μm$^2$ to 500 μm$^2$ and the length ranging from 3 mm to 25 mm, for example. The flow rate in the fourth flow path 34 may be equal to or larger than 0.2 m/s and equal to or smaller than 5 m/s, for example. As a result, the width of the lead-in flow can be set equal to or larger than 2 μm and equal to or smaller than 15 μm, for example, thus the red blood cell and the white blood cell can be separated from the blood.

The fourth flow path 34 further includes a fourth recovery flow path 39 connected to the fourth main flow path 37, and can recover the first particles. In the fourth flow path 34 in the present disclosure, the first particles can be recovered in the fourth recovery flow path 39 using the pressing flow.

The fourth flow path 34 may include a fourth disposal flow path 40 connected to the plurality of fourth branch flow paths 38. The fourth disposal flow path 40 may recover or dispose of the separated second particles. When the first particles are recovered by the plurality of fourth branch flow paths 38, one fourth disposal flow path 40 to which the plurality of fourth branch flow paths 38 are connected functions as a flow path for recovering the first particles. The fluid flowing to an end of the fourth main flow path 37 may be disposed of in this case.

The fourth flow path 34 includes a plurality of fourth openings 41 located on the surface of the separation flow path device 33. The plurality of four openings 41 include a fourth sample flow inlet 42 through which the sample flows into at least the fourth main flow path 37, a fourth sample flow outlet 43 through which the first particles are recovered from the fourth recovery flow path 39, and at least one fourth disposal flow outlet 44 through which constituents in which the first particles are removed from the sample are recovered. Included in the present disclosure is a fourth pressing flow inlet 45 through which a third fluid for pressing the sample against the side of the fourth branch flow path 38 flows. In the present disclosure, the fourth disposal flow outlet 44 is connected to the fourth main flow path 37 and the fourth disposal flow path 40. The fluid flowing out through the fourth disposal flow outlet 44 is recovered through a through hole 44' formed in the measurement flow path device 2A described hereinafter. The fourth sample flow outlet 43 is connected to the first flow inlet 12 of the first flow path 5 in the measurement flow path device 2A.

(Measurement Flow Path Device)

Figure 14:
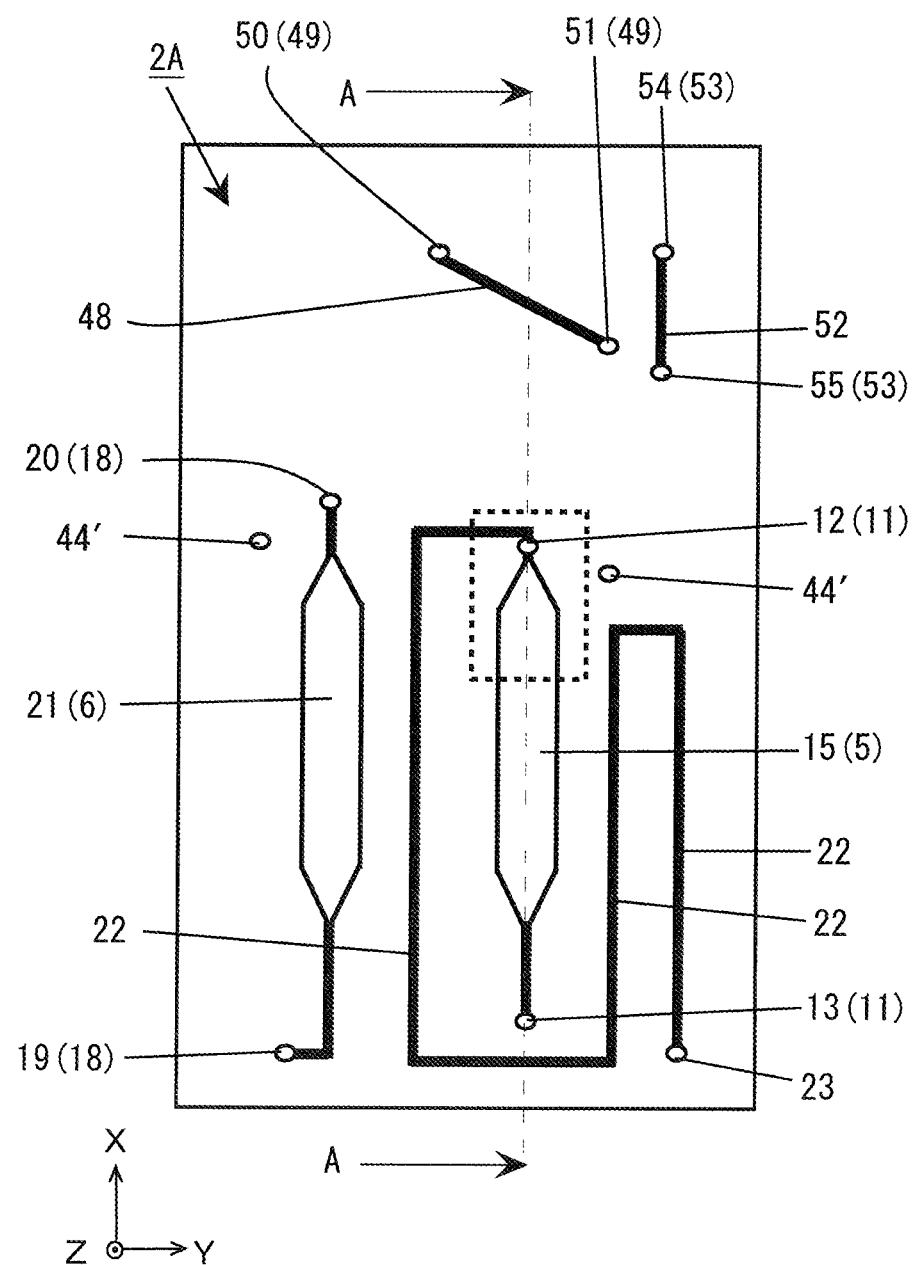
FIG. 14 illustrates a top view showing a part of the measurement apparatus according to the second embodiment of the present disclosure.

FIG. 14 schematically illustrates the measurement flow path device 2A. FIG. 14 is a view of the measurement flow path device 2A when seen from an upper surface side transparently.

An upper surface of the measurement flow path device 2A in the present disclosure includes a first region 46 and a second region 47 as illustrated in FIG. 10. In a plan view, the first flow path 5 in the measurement flow path device 2A is located to extend from the first region 46 to the second region 47, and the separation flow path device 33 is located only in the first region 46 in the measurement flow path device 2A. As a result, the first flow path 5 is exposed to the second region 47, thus the second region 47 can be used as a measurement region. The mirror 24 is located on the second region 47 according to the present disclosure.

The measurement flow path device 2A may further include a fifth flow path 48 different from the first flow path 5, the second flow path 6, and the third flow path 22. The fifth flow path 48 may include a plurality of fifth openings 49 located on a surface of the measurement flow path device 2A. The fifth flow path 48 can function as a flow path in which the sample before the microparticles are separated flows.

The plurality of fifth openings 49 include a fifth flow inlet 50 and a fifth flow outlet 51. The fifth flow inlet 50 is an opening through which the sample flows into the fifth flow path 48. The fifth flow outlet 51 is an opening through which the sample flows from the fifth flow path 48. The fifth flow inlet 50 is exposed outside, and the fifth flow outlet 51 is connected to the fourth sample flow inlet 42 of the separation flow path device 33.

The fifth flow inlet 50 and the fifth flow outlet 51 are located on the upper surface of the measurement flow path device 2A (the upper surface of the first substrate 9). In the present disclosure, the fifth flow inlet 50 is located in the same surface as that of the first flow inlet 12. In the present disclosure, the fifth flow outlet 51 is located in the same surface as that of the first flow inlet 12. The fifth flow outlet 51 is located in the same surface as that of the fifth flow inlet 50 of the plurality of fifth openings 49 and the third opening 23.

The measurement flow path device 2A may further include a sixth flow path 52 different from the first flow path 5, the second flow path 6, the third flow path 22, and the fifth flow path 48. The sixth flow path 52 includes a plurality of sixth openings 53 located on the surface of the measurement flow path device 2A. The plurality of sixth openings 53 include a sixth flow inlet 54 and a sixth flow outlet 55. The sixth flow inlet 54 is an opening through which the third fluid flows into the sixth flow path 52. The sixth flow outlet 55 is an opening through which the third fluid flows from the sixth flow path 52. The sixth flow inlet 54 is exposed outside, and the sixth flow outlet 55 is connected to the fourth pressing flow inlet 45 of the separation flow path device 33.

(Connection Structure of Separation Flow Path Device and Measurement Flow Path Device)

FIG. 15 schematically illustrates a connection structure of the separation flow path device and the measurement flow path device. FIG. 15 is an enlarged view of a broken line section in FIG. 10.

The separation flow path device 33 is located on the upper surface of the measurement flow path device 2A as described above. Specifically, a sheet member 56 may intervene between the lower surface of the separation flow path device 33 and the upper surface of the measurement flow path device 2A. In other words, the measurement apparatus 1A may include the sheet member 56 located between the separation flow path device 33 and the measurement flow path device 2A.

The sheet member 56 has a function as an intermediate layer for bonding hardly-adhesive materials. The sheet member 56 may be formed of a material such as silicone or PDMS, for example. The sheet member 56 includes a plurality of through holes 57. The fluid flows between the separation flow path device 33 and the measurement flow path device 2A via the through holes 57. The separation flow path device 33 and the measurement flow path device 2A in the present disclosure are connected via an adhesive agent applied to a lower surface of the sheet member 56.

As illustrated in FIG. 11, the measurement apparatus 1A according to the present disclosure further includes a first pump 26A supplying a fluid to the fifth flow path 48 and a fourth pump 58 supplying a fluid to a sixth flow path 52. The first pump 26A corresponds to the first pump 26 in the first embodiment. That is to say, the first pump 26A supplies the first fluid to the first flow path 5 via the fifth flow path 48 and the fourth flow path 34 in this order. The first pump 26A, the second pump 27, the third pump 28, and the fourth pump 58 lead to the fifth opening 49, the second opening 18, the third opening 23, and the sixth opening 53, respectively, via a plurality of other flow paths (not shown) such as tubes.

The controller 4A can control the measurement apparatus 1A. Specifically, the controller 4A can also control driving of the optical sensor 3, the first pump 26A, the second pump 27, the third pump 28, the fourth pump 58 and the like. The controller 4A can drive the first pump 26A to flow the fluid including the specific particles as the first fluid into the first flow path 5. The controller 4A can drive the second pump 27 to flow the fluid which does not include the specific particles as the second fluid into the second flow path 6. The controller 4A can drive the third pump 28 to flow the air (gas) into the third flow path 22. The controller 4A is made up of a combination of various circuits.

The controller 4A may flow the sample into the fourth main flow path 37 of the fourth flow path 34 after flowing the third fluid into the fourth main flow path 37 of the fourth flow path 34. The controller 4A may drive the first pump 26 to flow the sample into the fourth main flow path 37 after driving the fourth pump 58 to flow the third fluid into the fourth main flow path 37.

The present disclosure is not limited to the embodiments described above. That is to say, each constituent element of the first embodiment and the second embodiment described above may be appropriately combined, and various alternation and modifications, for example, should be possible within the scope of the present disclosure.

Figure 16:
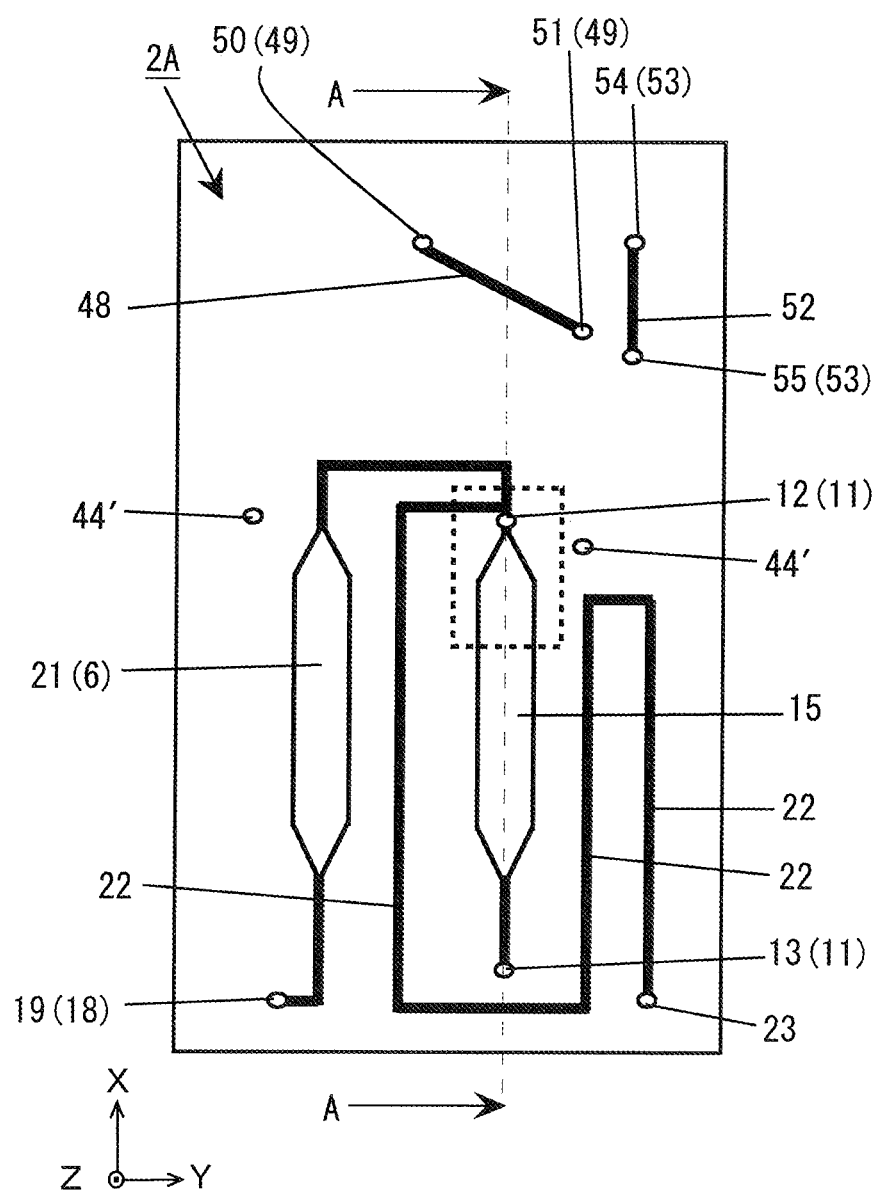
FIG. 16 illustrates a top view showing a part of the measurement apparatus according to the second embodiment of the present disclosure.

The above embodiments describe the example that one end of the second flow path 6 includes the second flow outlet 20, however, as illustrated in FIG. 16, one end of the second flow path 6 may be connected to the first flow path 5. When the second flow path 6 is connected to the first flow path 5, it is possible to flow the second fluid into the first flow path 5 via the second flow path 6. As a result, when an amount of the first fluid flowing into the first flow path 5 is small, it is possible to replenish the first flow path 5 with the second fluid via the second flow path 6. In this case, the second fluid may be the same fluid as the third fluid.

When the second flow path 6 is connected to the first flow path 5, the controller 4 (or the controller 4A) may flow a certain amount of second fluid into the first flow path 5 before the first fluid reaches the first flow path 5. As a result, the amount of the first particles included in a certain amount of solvent can be quantitively measured.

When the controller 4 (or the controller 4A) flows the second fluid into the first flow path 5, the controller 4 (or the controller 4A) may confirm presence or absence of the fluid using the optical sensor 3. In this case, it is also applicable that the controller 4 (or the controller 4A) drives the optical sensor 3 after driving the second pump 27 to flow the second fluid into the second flow path 6, and also drives the first pump 26 (or the first pump 26A and the fourth pump 58) to flow the first fluid into the first flow path 5 (and flow the third fluid into the sixth flow path 52). The controller 4 (or the controller 4A) may drive the second pump 27 in a certain period time after driving the first pump 26 (or the first pump 26A and the fourth pump 58).

When the first flow path 5 and the second flow path 6 are connected to each other, the third flow path 22 may be connected to a connection part between the first flow path 5 and the second flow path 6. In this case, the controller 4 (or the controller 4A) may firstly flow the first fluid into the first flow path 5 after flowing the second fluid into the first flow path 5, and then flows the gas into the first flow path 5. As a result, the inflow of the first fluid into the second flow path 6 can be reduced.

It is also applicable to flow the gas into the first flow path 5 to divide the second fluid ranging from the second flow path 6 to the first flow path 5, and then flow the first fluid therein. In this case, the controller 4 (or the controller 4A) drives the third pump 28 after driving the second pump 27, and then drives the first pump 26.

Described in the second embodiment described above is the example of supplying the third fluid from the sixth flow path 52 to the fourth flow path 34, however, the third fluid may be supplied from the second flow path 6 instead of the sixth flow path 52. In this case, the second fluid is the same as the third fluid. That is to say, it is also applicable that there is no sixth flow path 52, and one end of the second flow path 6 is connected to the fourth pressing flow inlet 45 of the fourth flow path 4.

Described in the second embodiment described above is the example that the separation flow path device 33 includes the third substrate 35 and the fourth substrate 36, however, the sheet member 56 may also function as the fourth substrate 36 instead of the fourth substrate 36.

The invention claimed is:

1. A flow path device, comprising:
a plate-like measurement flow path device; and
a plate-like separation flow path device, wherein
the plate-like measurement flow path device includes a first flow path for performing a measurement regarding specific particles on a first fluid including the specific particles, a second flow path for correction through which a second fluid which does not include the specific particles passes, and a third flow path connected to the first flow path,
the plate-like separation flow path device includes a fourth flow path for separating and selecting the specific particles from a sample including the specific particles and collecting a fluid including the specific particles as the first fluid,
the plate-like separation flow path device is located on an upper surface of the plate-like measurement flow path device,
the sample passes through a fifth flow path included in the plate-like measurement flow path device, passes through an opening in the upper surface of the plate-like measurement flow path device, and then flows into the fourth flow path from an opening in a lower surface of the plate-like separation flow path device, and
the first fluid passes through an opening in the lower surface of the plate-like separation flow path device, and then flows into the first flow path from an opening in the upper surface of the plate-like measurement flow path device.

2. The flow path device according to claim 1, wherein the sample flows into the fifth flow path from an opening in the upper surface of the plate-like measurement flow path device.

3. The flow path device according to claim 1, wherein the fourth flow path includes a fourth main flow path and a plurality of fourth branch flow paths branching from the fourth main flow path, flows a third fluid which does not include the specific particles with the sample, and generates a pressing flow, which can press the sample flowing in the fourth main flow path against a side of the fourth branch flow paths, thereby separating the specific particles and collecting the fluid including the specific particles as the first fluid.

4. The flow path device according to claim 3, wherein the third fluid passes through a sixth flow path included in the plate-like measurement flow path device, passes through an opening in the upper surface of the plate-like measurement flow path device, and then flows into the fourth flow path from an opening in the lower surface of the plate-like separation flow path device.

5. The flow path device according to claim 4, wherein the third fluid flows into the sixth flow path from an opening in the upper surface of the plate-like measurement flow path device.

6. The flow path device according to claim 1, wherein the plate-like measurement flow path device includes a first region and a second region in the upper surface, and
in a plan view, the first flow path is located to extend from the first region to the second region, and the plate-like separation flow path device is located only in the first region.

7. The flow path device according to claim 1, wherein a pressing fluid for stirring or pressing the first fluid that has flowed into the first flow path flows into the third flow path.

8. The flow path device according to claim 1, wherein a sheet member having a plurality of through holes intervenes between the lower surface of the plate-like separation flow path device and the upper surface of the plate-like measurement flow path device.

9. A measurement apparatus, comprising:
the flow path device according to claim 1; and
an optical sensor located to face the plate-like measurement flow path device.

10. The measurement apparatus according to claim 9, wherein
the optical sensor includes a light-emitting element and a light receiving element.

11. The measurement apparatus according to claim 9, wherein
the optical sensor is located to be movable in a planar direction with respect to a surface of the plate-like measurement flow path device.

* * * * *